(12) United States Patent
Kubo

(10) Patent No.: US 6,268,967 B1
(45) Date of Patent: Jul. 31, 2001

(54) ZOOM LENS APPARATUS

(75) Inventor: Kenichi Kubo, Utsunomiya (JP)

(73) Assignee: Canon Kabushiki Kaisha

( * ) Notice: Subject to any disclaimer, the term of this patent is extended or adjusted under 35 U.S.C. 154(b) by 0 days.

(21) Appl. No.: 09/589,410

(22) Filed: Jun. 7, 2000

(30) Foreign Application Priority Data

Jun. 9, 1999 (JP) .................................................. 11-162663

(51) Int. Cl.⁷ ............................ G02B 15/14; G03B 17/00
(52) U.S. Cl. ............................ 359/696; 359/698; 396/77; 396/91; 396/104; 348/64; 348/358; 250/201.2
(58) Field of Search ................................... 359/696, 697, 359/698; 396/91, 104, 106, 77; 250/201.2, 201.4; 348/64, 137, 358

(56) References Cited

U.S. PATENT DOCUMENTS 5,331,419 * 7/1994 Yamada et al. .......................... 348/64
6,134,390 * 10/2000 Kasuya .................................... 396/77

FOREIGN PATENT DOCUMENTS

03135171 * 6/1991 (JP) .

* cited by examiner

*Primary Examiner*—Loha Ben
(74) *Attorney, Agent, or Firm*—Morgan & Finnegan, L.L.P.

(57) ABSTRACT

The present invention relates to a zoom lens apparatus used with a television camera and provides an apparatus constructed in such structure that, on the occasion of limiting an angle of view, a zoom state set and manipulated by a photographer is converted to information about an angle of view, the angle of view is compared with a limit angle of view, and the angle of view is prevented from exceeding the limit angle of view.

16 Claims, 7 Drawing Sheets

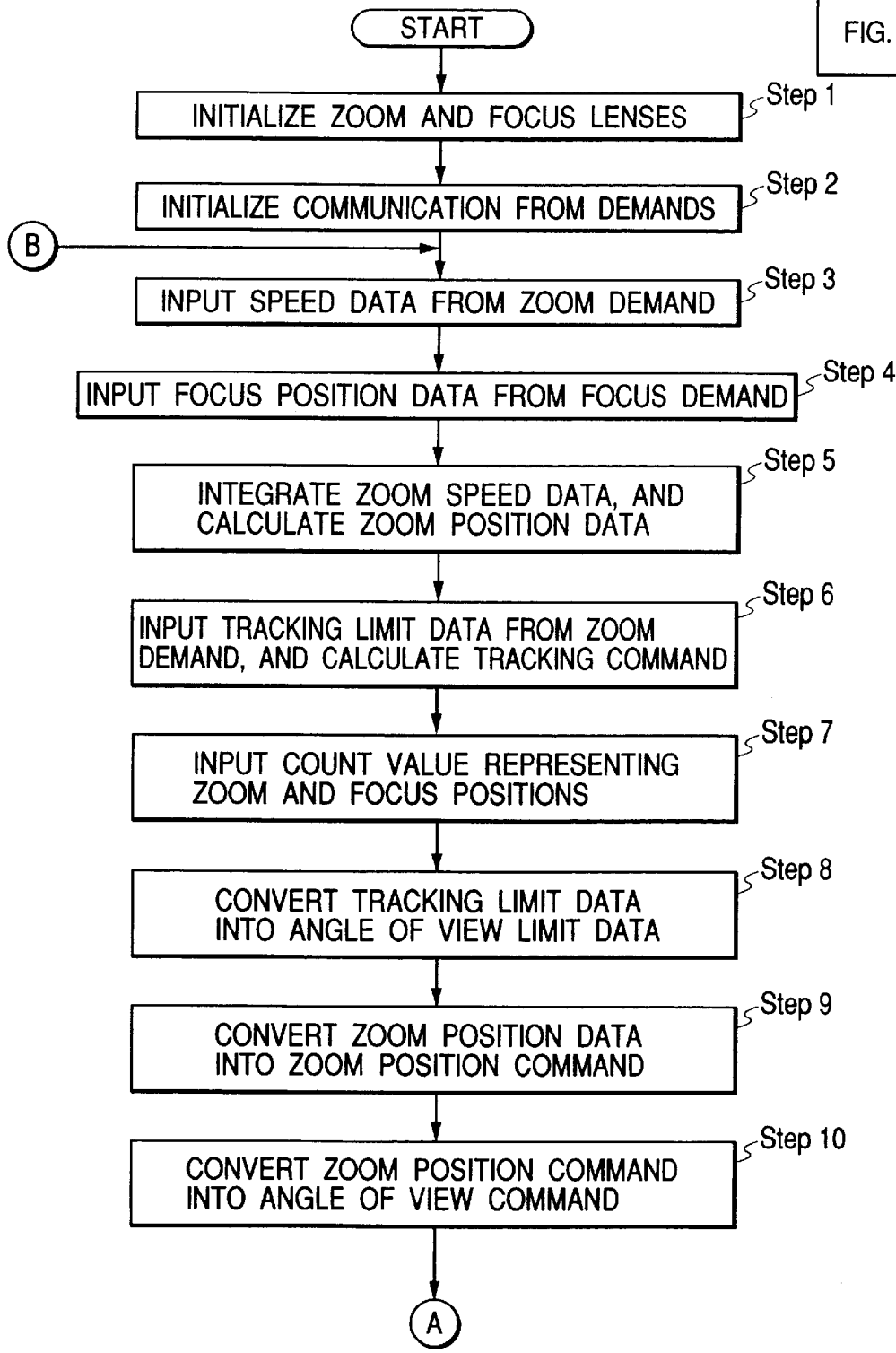

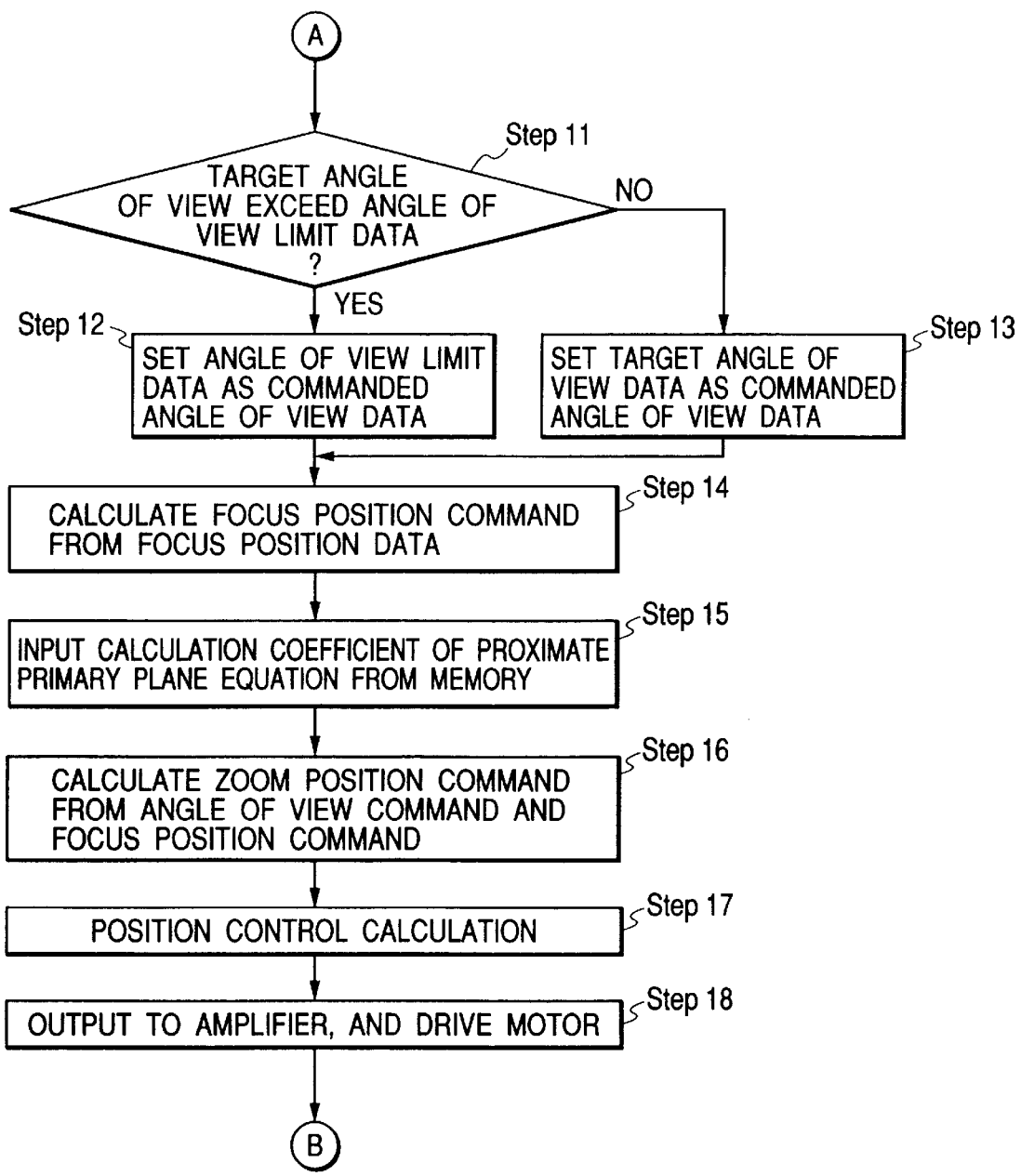

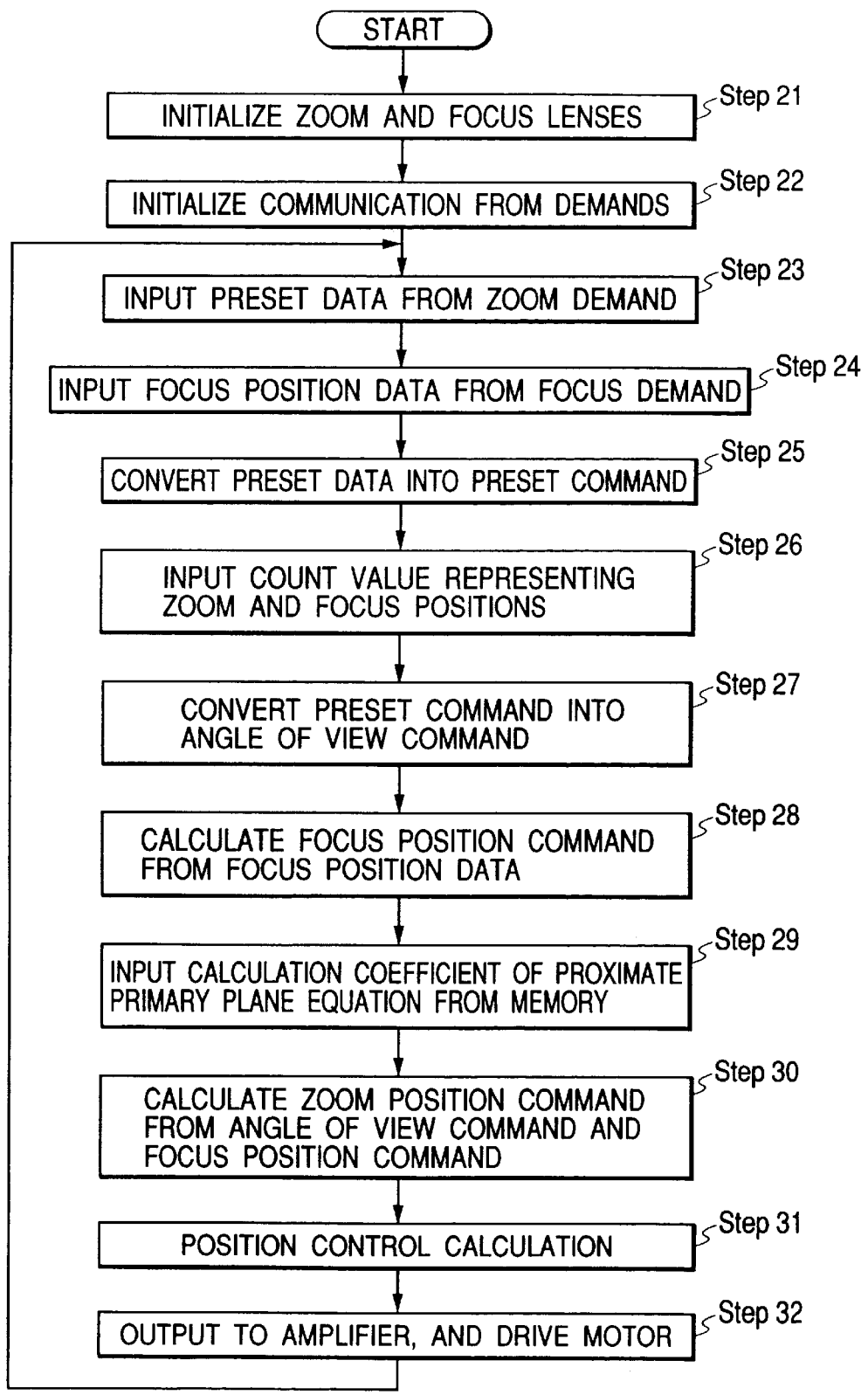

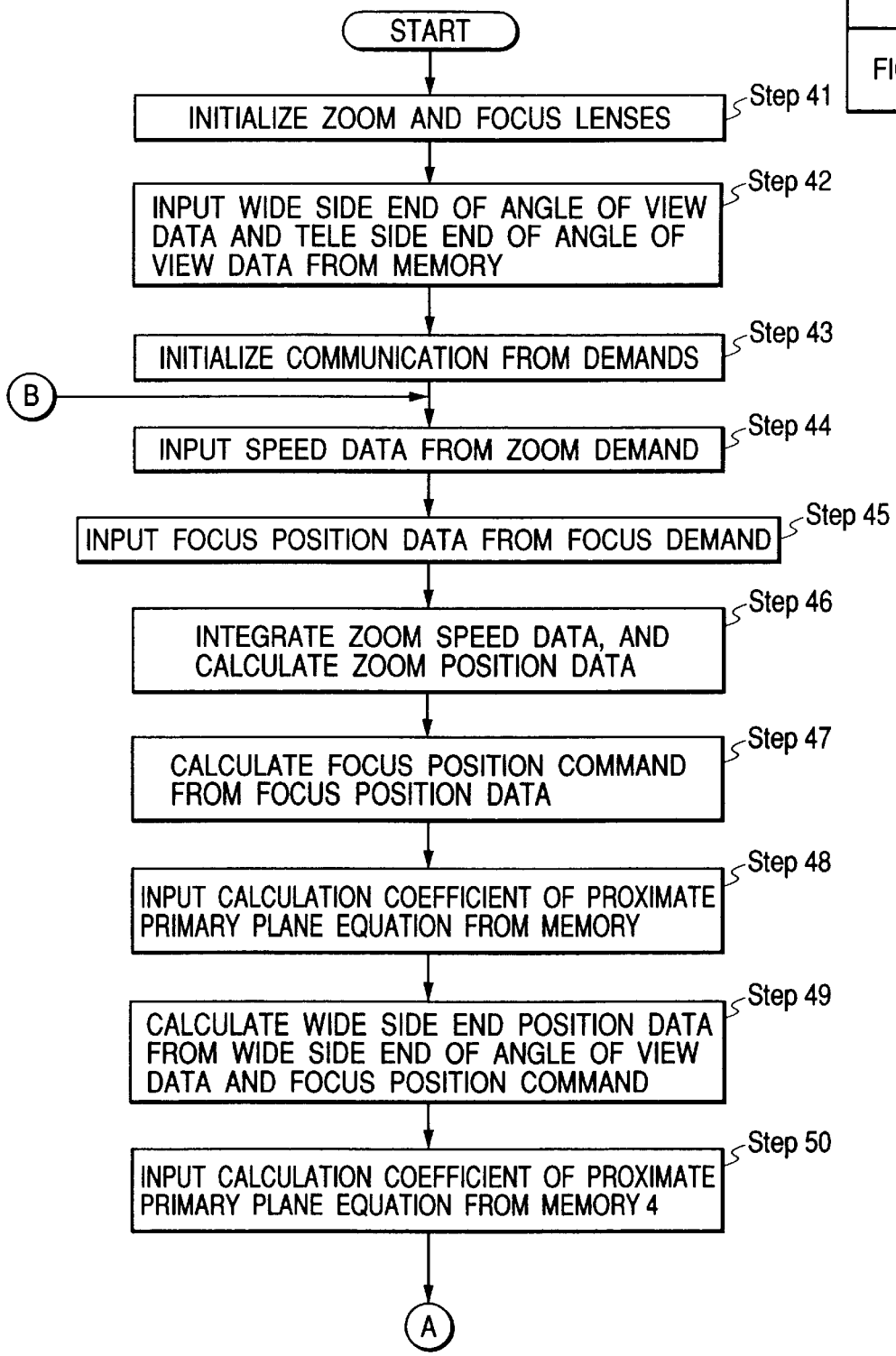

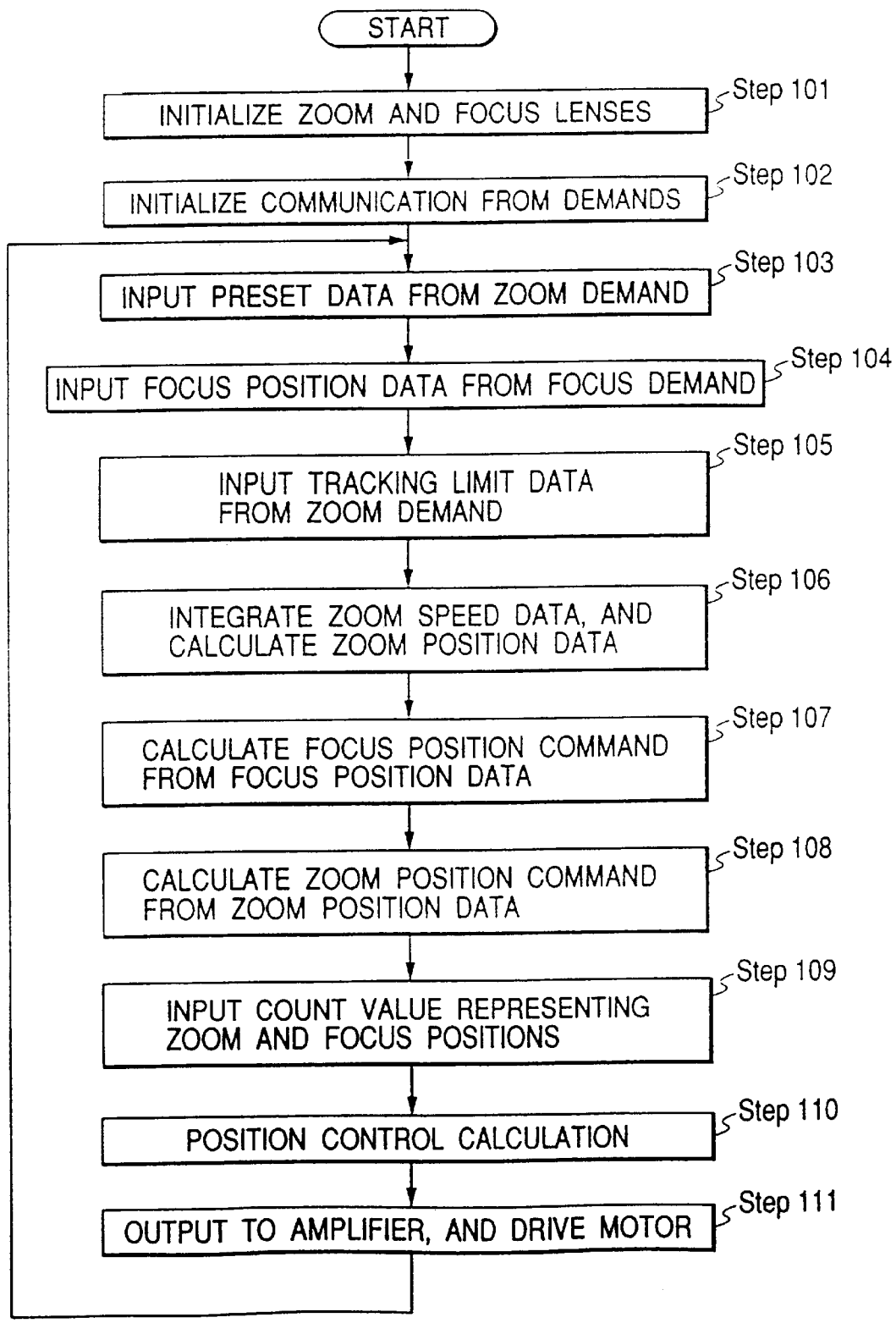

ZOOM LENS APPARATUS

BACKGROUND OF THE INVENTION

1. Field of the Invention

The present invention relates to a zoom lens used in TV cameras and the like.

2. Related Background Art

There are zoom lenses having the function of limiting a driving range of a zoom portion (which is so called the tracking function). With the zoom lenses developing their wider-angle tendency and higher-magnification tendency through the years, there are circumstances where a person or the like unwanted to take around a subject is present in the field with the zoom portion on the wide-angle side, whereas there are also circumstances where the subject is magnified so as to be too large to be settled in the field with the zoom portion at the telephoto extreme. Under such circumstances, a lens operator always has to finely adjust zoom stop positions on the wide-angle side and on the telephoto side by a zoom demand.

Thus the tracking function becomes useful for limiting the driving range of the zoom portion and permitting such photography of picture that only the subject desired to take is photographed at the wide-angle extreme and that the entire image of the subject is just fitted in the field at the telephoto extreme, without the need for the fine adjustment by the zoom demand.

There are also zoom lenses having the zoom preset function. In the case of news report programs, baseball relay broadcasting, etc., there are such occasions that a specific person is repeatedly taken many times in a specific size. The operator needed to set the zoom at the position for the photography in the specific size by manipulating the zoom demand every such occasion.

When the zoom preset function is used on such occasions, any given zoom position can be stored, and the zoom portion can be set at the stored zoom position by manipulating a switch as necessary, whereby the specific person can be photographed in the specific size.

FIG. 5 shows a control flowchart in a method of controlling the positions of lenses constituting the zoom portion and the focus portion in a zoom lens having the tracking function and the zoom preset function.

In this zoom lens, each of zoom preset data and tracking limit data from the zoom demand is converted into counter-equivalent position data (steps 103 to 106); the position data after the conversion is compared with values of the counters and arithmetic operations are carried out (steps 107 to 110); and a motor is driven to control the position of each lens (step 111).

In the control using the position data of the lenses as described above, however, when the driving range of the zoom portion is limited by the tracking function, the angle of view at the tracking end varies depending upon the lens position of the focus portion, because the angle of view varies with driving of the focus portion.

In use of the zoom preset function, similarly, if the focus position upon storage of the lens position of the zoom portion is different from that upon setting of the zoom position by use of the preset function, the angle of view after the preset operation will be different from that upon the storage.

An object of the present invention is, therefore, to provide a zoom lens capable of keeping the angle of view constant under use of the tracking function and/or the zoom preset function, regardless of the focus driving.

SUMMARY OF THE INVENTION

One aspect of the application is to provide a control apparatus for a zoom lens, which drives and controls a zoom portion and a focus portion in accordance with input of zoom control information and focus control information, the control apparatus comprising an arithmetic circuit which obtains target angle-of-view information by comparison between a permissible angle of view indicating at least one (limit value) of a maximum and a minimum of angles of view and angle-of-view information resulting from conversion from the zoom control information to angle-of-view information by a converting circuit and which obtains zoom command information for achieving the target angle of view, based on the target angle of view and the focus control information.

One aspect of the application is to provide a control apparatus for a zoom lens, which drives and controls a zoom portion and a focus portion in accordance with input of zoom control information and focus control information, the control apparatus comprising an arithmetic circuit which obtains a commanded angle of view by comparison between a permissible angle-of-view range indicating a range of angles of view in which variation is permitted, and angle-of-view information resulting from conversion from the zoom control information to angle-of-view information by a converting circuit, and which obtains zoom command information for achieving the commanded angle of view, based on the commanded angle of view and the focus control information.

One aspect of the application is to provide a control apparatus for a zoom lens, which drives and controls a zoom portion and a focus portion in accordance with input of zoom control information and focus control information, wherein a permissible drive end of the zoom portion for achieving a permissible angle of view is calculated based on the permissible angle of view and the focus control information, and wherein the zoom portion is driven, based on comparison between the permissible drive end and the zoom control information.

One aspect of the application is to provide a zoom control apparatus comprising a manipulation member by which a zoom position is changed, a zoom position information forming circuit which forms zoom position information indicating the zoom position according to manipulation by the manipulation member, a converting circuit which converts the zoom position information to angle-of-view information, a limit information setting circuit which sets limit angle-of-view information, an arithmetic circuit which compares the limit angle-of-view information with the angle-of-view information obtained by the converting circuit and which calculates zoom position information for achieving the limit angle of view, based upon focus information indicating a focus position and upon the limit angle-of-view information, on the occasion of occurrence of such a situation that the angle-of-view information after the conversion exceeds the limit angle of view, and a control circuit which controls a zoom state in accordance with the zoom position information thus calculated.

One aspect of the application is to provide a zoom control apparatus comprising a zoom position information forming circuit which forms zoom position information indicating a target zoom position, a converting circuit which converts the zoom position information to target angle-of-view information, an arithmetic circuit which calculates zoom position information corresponding to the angle-of-view information, based upon focus information indicating a focus position and upon the angle-of-view information, and a control circuit which implements transfer into a zoom state according to the zoom position information thus calculated.

One aspect of the application is to provide a zoom control apparatus comprising a manipulation member by which a zoom position is changed, a zoom position information forming circuit which forms zoom position information indicating the zoom position according to manipulation by the manipulation member, a limit information setting circuit which sets limit angle-of-view information, an arithmetic circuit which calculates a limit position indicating a limit zoom position according to the limit angle of view, based upon the limit angle-of-view information and upon focus position information indicating a focus position, and a control circuit which compares the limit position with the zoom position information formed by the zoom position information forming circuit and which regulates a zoom state in which there occurs such a situation that the zoom position information exceeds the limit position, to the limit position.

The other objects of the present invention will become more apparent by embodiments which will be described below with reference to the drawings.

BRIEF DESCRIPTION OF THE DRAWINGS

FIG. 2 which comprised of FIGS. 2A and 2B is an operation flowchart in the zoom lens of the first embodiment;

FIG. 3 is an operation flowchart in the zoom lens of the second embodiment;

FIG. 5 is an operation flowchart in the conventional zoom lens.

DESCRIPTION OF THE PREFERRED EMBODIMENTS (First Embodiment)

Figure 1:
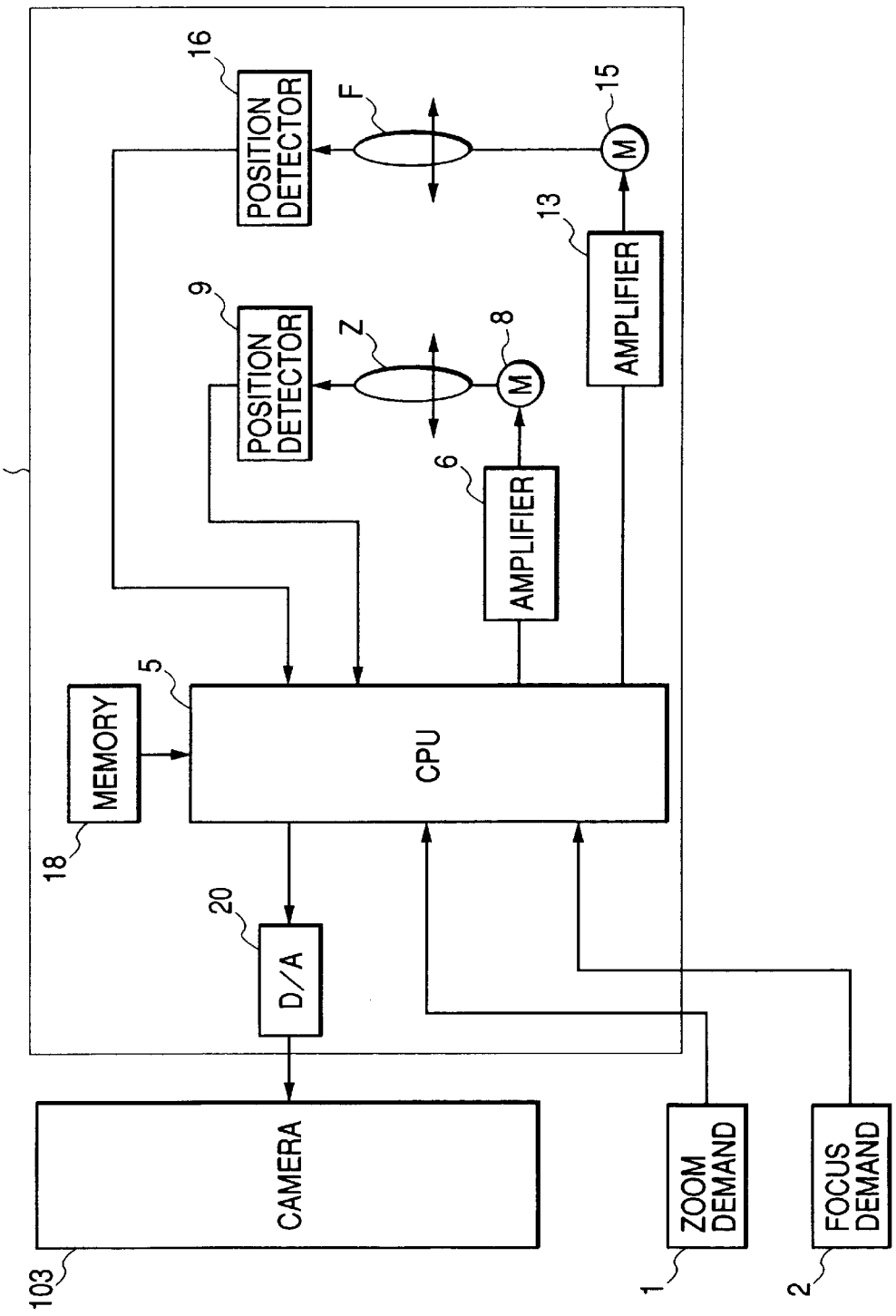
FIG. 1 is a structural diagram of a zoom lens which is an embodiment of the present invention.

FIG. 1 shows the structure of the zoom lens which is the first embodiment of the present invention. This zoom lens 101 is equipped with a zoom demand 1 and a focus demand 2 (manipulation devices) to compose a zoom lens system and is connected in a communicable state to a camera 103 to compose a camera system.

Numeral 5 designates a CPU (control means) and the zoom demand 1 and the focus demand 2 are connected to this CPU 5. The CPU 5 accepts input of zoom speed data (zoom control information) corresponding to a manipulation speed of the zoom demand 1 therefrom. The CPU 5 also accepts input of focus position data (focus control information) corresponding to a manipulation amount of the focus demand 2 therefrom.

An output of the CPU 5 is connected via an amplifier 6 to a motor 8, which drives a lens constituting a zoom portion Z. The zoom portion Z is provided with a position detector 9, which outputs a voltage according to an absolute position of the lens. This position detector 9 is connected to the CPU 5.

Another output of the CPU 5 is connected via an amplifier 13 to a motor 15, which drives a lens constituting a focus portion F. The focus portion F is provided with a position detector 16, which outputs a voltage according to an absolute position of the lens. This position detector 16 is connected to the CPU 5.

Another output of the CPU 5 is connected via a D/A converter 20 to the TV camera 103. By this, follow signals indicating various states of the zoom lens 101, such as zoom follow data indicating the lens position of the zoom portion Z, iris follow data indicating a state of an unrepresented stop, etc. are transmitted to the camera 103.

Also connected to the CPU 5 is a non-volatile memory 18, which stores data for obtaining a relation between the positions of the lenses respectively constituting the zoom portion Z and the focus portion F (which will be referred to hereinafter as the zoom position and the focus position), and the angle of view. The data stored in the memory 18 will be described below briefly.

A lens drive range from the wide-angle extreme to the telephoto extreme of the zoom portion Z is divided into an arbitrary number n of segments, a lens drive range from the infinite extreme to the nearest extreme of the focus portion F is also divided similarly into an arbitrary number m of segments, and output data of a pulse-counting counter in each of the position detectors 9, 16 is calculated. An angle of view at the with divisional point of zoom and at the jth divisional point of focus is obtained by optical computing, and likewise, angles of view at the with divisional point of zoom and at the (j+1)th divisional point of focus, at the (i+1)th divisional point of zoom and at the jth divisional point of focus, and at the (i+1)th divisional point of zoom and at the (j+1)th divisional point of focus are also obtained by optical computing. The relation among zoom position, focus position, and angle of view in a region surrounded by these four points is approximated to an equation of a plane including three points out of the four points. By applying the equation of this approximate plane, the angle of view can be expressed by the function of Eq. (1) below having variables of the zoom position and the focus position.

$$\omega = Cz \times \text{Zoom} + Cf \times \text{Focus} + D \tag{1}$$

ω: angle of view

Zoom: zoom position command

Focus: focus position command

Cz: coefficient for the zoom position of the proximate primary plane equation

Cf: coefficient for the focus position of the proximate primary plane equation

D: constant term of the proximate primary plane equation

Values of these coefficients Cz, Cf, and D thus obtained are stored in the form of a map of data in the memory 18.

The flowchart of FIGS. 2A and 2B illustrates a series of operations from immediately after switch-on of power, through tracking setting manipulation, tracking control of the zoom portion Z in response to the manipulation of the zoom demand 1, and driving control of the focus portion F in response to manipulation of the focus demand 2, up to execution of correction for tracking angle-of-view variation of the zoom portion Z due to the driving control of the focus portion F in the above zoom lens.

Immediately after switch-on of power, the CPU 5 goes into step 1 to initialize the interior of the CPU 5. It also initializes the lens constituting the zoom portion Z and the lens constituting the focus portion F by use of outputs from the position detectors 9, 16.

Next, in step 2, the CPU initializes communication with the zoom demand 1 and the focus demand 2. The initialization operation is completed here and then the CPU transfers to the normal operation to control the zoom portion Z and the focus portion F in accordance with the outputs from the zoom demand 1 and from the focus demand 2.

In step 3 the CPU accepts input of normalized zoom speed data Zspeed from the zoom demand 1 and in step 4 the CPU accepts input of normalized focus position data Fdata from the focus demand 2.

In next step 5 the CPU integrates the zoom speed data Zspeed according to Eq. (2) below to calculate normalized zoom position data.

$$Zdata = Zbuf + K \times Zspeed \qquad (2)$$

Zdata: normalized zoom position data

Zbuf: normalized zoom position data upon preceding sampling

K: integration constant

Zspeed: zoom speed data

In next step 6, the CPU accepts input of tracking limit data Tdata corresponding to normalized zoom position data from the zoom demand 1 and converts it to a tracking command Track corresponding to an output of the counter in the position detector 9 by use of Eq. (3) below.

$$Track = Wide + Tdata/NOM \times (Tele - Wide) \qquad (3)$$

Track: tracking command corresponding to output of the counter

Wide: wide-extreme zoom position command

Tdata: normalized tracking limit data

NOM: maximum of normalized data

Tele: tele-extreme zoom position command

This tracking command is a command indicating a zoom drive permissible end (zoom position) for the camera user to limit variations in the angle of view to a desired range out of the range from the wide-angle extreme to the telephoto extreme, which can be either of a command corresponding to a maximum out of the limited angles of view, a command corresponding to a minimum out thereof, and a command corresponding to the both. The normalized tracking limit data Tdata is set according to selection manipulation or the like at the zoom demand 1 by the user.

In next step 7, the output of the counter in the position detector 9 is set in a counter buffer Zfol and the output of the counter in the position detector 16 in a counter buffer Ffol.

Further, in step 8, the CPU calculates where the tracking command Track and the counter buffer Ffol are located out of the regions obtained by the division of the driving ranges into the arbitrary numbers of segments and then the CPU reads the calculation coefficients Cz, Cf, and D of the proximate primary plane equation according to the region determined by the calculation out of the memory 18 and substitutes them together with the tracking command Track and the counter buffer Ffol into Eq. (1) to convert the data into angle-of-view limit data Wlimit. After this operation, the CPU comes to have the tracking limit data in the form of the angle-of-view data, which was the data of zoom position before.

In step 9, the CPU substitutes the normalized zoom position data Zdata into Tdata of Eq. (3) to convert it into a zoom position command Zoom corresponding to an output of the counter of the position detector 9.

Next in step 10, the CPU calculates where the zoom position command Zoom and the counter buffer Ffol are located out of the regions obtained by the division of the driving ranges into the arbitrary numbers of segments, and then reads the calculation coefficients Cz', Cf', and D' of the proximate primary plane equation according to the region resulting from the calculation out of the memory 18. Then the CPU substitutes them together with the zoom position command Zoom and the counter buffer Ffol into Eq. (1) to convert the data into angle-of-view target data (a target angle of view) Wpos. After this operation, the CPU comes to have a drive target of the zoom portion Z in the form of the angle-of-view data, which was the data of zoom position before.

In step 11 the CPU then compares the angle-of-view target data Wpos with the angle-of-view limit data Wlimit. When the angle-of-view target data Wpos exceeds the angle-of-view limit data Wlimit (i.e., when the angle-of-view target data indicates an angle of view greater than the permissible maximum angle of view in the case of the angle-of-view limit data indicating the permissible maximum angle of view or when the angle-of-view target data indicates an angle of view smaller than the permissible minimum angle of view in the case of the angle-of-view limit data indicating the permissible minimum angle of view), the CPU proceeds to step 12 to set the angle-of-view limit data as angle-of-view command data (a commanded angle of view) Wpos'.

When the angle-of-view target data Wpos does not exceed the angle-of-view limit data Wlimit (i.e., when the angle-of-view target data indicates an angle of view not more than the permissible maximum angle of view in the case of the angle-of-view limit data indicating the permissible maximum angle of view or when the angle-of-view target data indicates an angle of view not less than the permissible minimum angle of view in the case of the angle-of-view limit data indicating the permissible minimum angle of view), the CPU moves to step 13 to set the angle-of-view target data as angle-of-view command data Wpos'.

After obtaining the angle-of-view command data in this way, the CPU goes to step 14 to convert focus position data Fdata received from the focus demand 2, into a focus position command Focus by use of Eq. (4) below.

$$Focus = Far + FData/NOM \times (Near - Far) \qquad (4)$$

Focus: focus position command

Far: infinite-extreme focus position command

Near: nearest-extreme focus position command

FData: normalized focus position data

NOM: maximum of normalized position data

Further, in step 15, in order to gain a zoom position command Zoom, the CPU calculates where the counter buffers Zfol, Ffol are located out of the regions resulting from the division of the driving ranges into the arbitrary numbers of segments and then reads the calculation coefficients Cz, Cf, and D of the proximate primary plane equation according to the region determined by the calculation, out of the memory 18.

In step 16 the CPU then calculates the zoom position command Zoom, using the angle-of-view command data Wpos' and the focus position command Focus, the calculation coefficients Cz, Cf, D read out of the memory 18, and Eq. (5) below.

$$Zoom = (Wpos' - Cf \times Focus - D)/Cz \qquad (5)$$

Cz, Cf, D: coefficients of the proximate primary plane equation

Zoom: zoom position command

Focus: focus position command

Wpos': angle-of-view command data

In step 17 the CPU then performs position control calculation of the zoom portion Z by use of the zoom position command Zoom and the counter buffer Zfol and also performs position control calculation of the focus portion F by use of the focus position command Focus and the counter buffer Ffol.

In subsequent step 18, the CPU outputs the result of the position control calculation of the zoom portion Z, gained in step 17, to the amplifier 6 to actuate the motor 8 and also outputs the result of the position control calculation of the focus portion F to the amplifier 13 to actuate the motor 15. Thereafter, the CPU repeatedly carries out step 3 to step 18 until the power is switched off.

In the present embodiment, as described above, the apparatus has the data corresponding to the driving target of the zoom portion and the tracking limit data in the form of the angle-of-view data, calculates the zoom position command to achieve the angle of view corresponding to the angle-of-view command data, based upon the angle-of-view command data determined by the comparison of these angle-of-view data and upon the focus position command, and controls the driving of the zoom portion Z, based on the zoom position command. Because of this structure, when the focus position moves with the zoom portion at the tracking end, the zoom position, which never moved over the tracking limit before, is allowed to move, whereby the angle of view at the tracking end can be kept constant (to effect so-called tracking angle-of-view variation correction). The angle of view can also be kept constant even if the focus portion is driven while the zoom portion is in the drive range inside the tracking end.

The present embodiment was described in the structure in which the zoom speed data corresponding to the manipulation speed of the zoom demand 1 was entered from the zoom demand 1 into the CPU 5 and in which the CPU 5 calculated the zoom position data and the target angle of view, but the apparatus may be modified in such structure that the zoom position data is entered from the zoom demand or in such structure that data indicating a target angle of view is entered directly therefrom.

The present embodiment was described in the structure in which the angle-of-view limit data was the permissible maximum or minimum angle of view, but the angle-of-view limit data may also be data indicating a permissible variation range of angles of view.

Further, the present embodiment was described in the structure in which the zoom control information was entered from the zoom demand 1, but the zoom control information may also be arranged to be entered from a control unit (manipulation device) of the camera.

Then the zoom demand and the camera control unit both may be connected to the zoom lens of the present embodiment. In this case, if the apparatus is arranged to accept input of data indicating the target angle of view from both the zoom demand and the camera control unit, there will arise no need for changeover of interface for connection to the CPU due to the difference between types of data supplied from the zoom demand and from the camera control unit (for example, in such structure that the demand supplies zoom speed data while the control unit supplies the zoom absolute position data).

(Second Embodiment)

FIG. 3 is a flowchart to show a series of operations from immediately after switch-on of power, through execution of preset operation of the zoom position and execution of reset operation into the preset state, up to execution of reset driving to the preset angle of view according to the state of the focus portion F in the zoom lens, which is the second embodiment of the present invention. Since the structure of the zoom lens of the present embodiment is the same as that in the first embodiment, the following description of operation will be done using the same reference symbols as those in the first embodiment, for the respective components.

Immediately after switch-on of power, the CPU 5 moves to step 21 to initialize the interior of the CPU 5. The CPU also initializes the lens constituting the zoom portion Z and the lens constituting the focus portion F by use of the outputs from the position detectors 9, 16. Next, in step 22 the CPU initializes communication with the zoom demand 1 and the focus demand 2. The initialization operation is completed here and then the CPU transfers to the normal operation to control the zoom portion Z and the focus portion F according to the outputs from the zoom demand 1 and from the focus demand 2.

In step 23 the CPU accepts input of normalized preset data Pdata from the zoom demand 1.

In step 24 the CPU then accepts input of normalized focus position data Fdata from the focus demand 2.

Further, in step 25 the CPU substitutes the preset data Pdata into Tdata of Eq. (3) described in the first embodiment (provided that the left-hand side is replaced by Wpreset) to convert the data into a preset command Preset corresponding to an output of the counter in the position detector 9. The preset command Preset here is a command indicating a zoom position corresponding to an angle of view desired by the user out of the angles of view ranging from the wide-angle-extreme angle of view to the telephoto-extreme angle of view achieved by driving of the zoom portion Z, and is set by selection manipulation or the like at the zoom demand 1 by the user.

In step 26 the output of the counter in the position detector 9 is then set in the counter buffer Zfol and the output of the counter in the position detector 16 is also set in the counter buffer Ffol.

Further, in step 27 the CPU calculates where the preset command Preset and the counter buffer Ffol are located out of the regions resulting from the division of the driving ranges into the arbitrary numbers of segments, and then reads the calculation coefficients Cz, Cf, and D of the proximate primary plane equation according to the region determined by the calculation, out of the memory 18. Then the CPU substitutes them together with the preset command Preset and the counter buffer Ffol into Eq. (1) to convert the data into preset angle-of-view command data Wpreset. This results in providing the CPU with the preset data in the form of the angle-of-view data, which was the data of zoom position before.

Next, in step 28 the CPU converts the focus position data (focus control information) Fdata into the focus position command (focus command information) Focus by use of Eq. (4) described in the first embodiment.

Next in step 29, in order to gain the zoom position command (zoom command information) Zoom, the CPU calculates where the counter buffers Zfol, Ffol are located out of the regions resulting from the division of the driving ranges into the arbitrary numbers of segments and then reads the calculation coefficients Cz', Cf', and D' of the proximate primary plane equation according to the region determined by the calculation, out of the memory 18.

In step 30 the CPU then calculates the zoom position command Zoom, using the preset angle-of-view command data Wpreset, the focus position command Focus, the calculation coefficients Cz', Cf', D', and Eq. (5) described in the first embodiment.

Further, in step 31 the CPU performs the position control calculation of the zoom portion Z by use of the zoom position command Zoom and the counter buffer Zfol and also performs the position control calculation of the focus portion F by use of the focus position command Focus and the counter buffer Ffol.

In step 32 the CPU then outputs the result of the position control calculation of the zoom portion Z, gained in step 31, to the amplifier 6 to actuate the motor 8 and also outputs the result of the position control calculation of the focus portion F to the amplifier 13 to actuate the motor 15. Thereafter, the CPU repeatedly carries out step 23 to step 32 until the power is switched off.

In the present embodiment, as described above, the apparatus is provided with the preset data of the zoom portion in the form of the angle-of-view data and is constructed to determine the zoom position command to achieve the angle of view (i.e., the preset angle of view) corresponding to the angle-of-view command data, based on the angle-of-view command data and the focus position command, and control the driving of the zoom portion Z, based thereon. Thanks to this arrangement, in cases wherein the focus position moves after execution of the zoom preset operation and the reset operation into the preset state is effected thereafter, the zoom position, which was fixed before by the preset operation of position, is allowed to move, whereby the angle of view upon the preset operation can be kept constant (to effect so-called preset angle-of-view variation correction).

The present embodiment was described in the structure in which the information indicating the preset position of the zoom portion Z was supplied from the zoom demand 1 into the CPU 5 and in which the CPU 5 calculated the commanded angle of view being the preset angle of view, but the apparatus may also be modified so that the data indicating the commanded angle of view is supplied directly from the zoom demand.

Further, the present embodiment was described in the structure in which the zoom control information was supplied from the zoom demand 1, but the apparatus may also be modified so that the zoom control information is supplied from the control unit (manipulation device) of the camera.

Then the zoom demand and the camera control unit both may be connected to the zoom lens of the present embodiment. In this case, if the data indicating the commanded angle of view is supplied from both the zoom demand and the camera control unit, there will be no need for switching of interface for connection to the CPU due to the difference between the types of data supplied from the zoom demand and from the camera control unit.

(Third Embodiment)

Figure 4B:
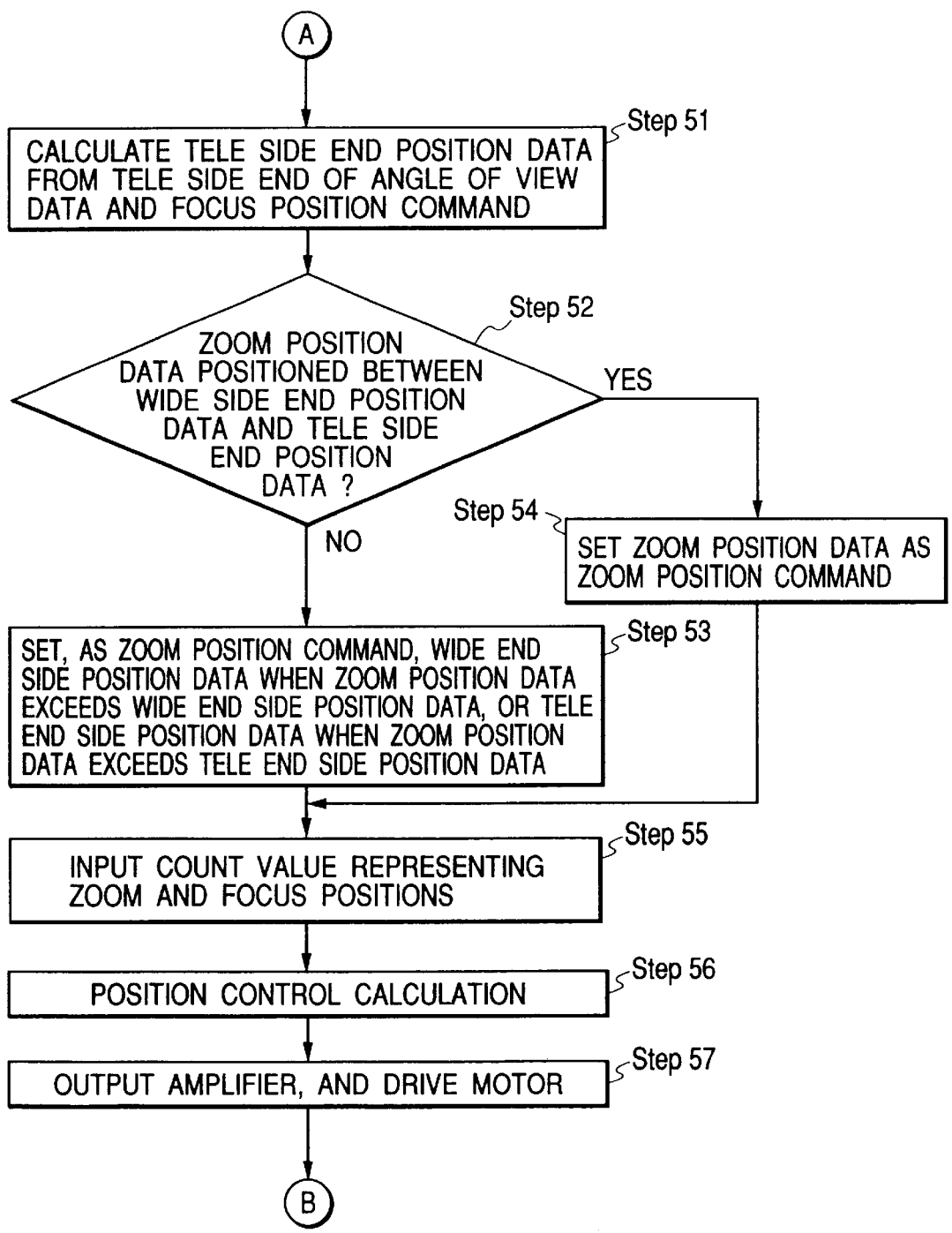
FIG. 4 which comprised of FIGS. 4A and 4B is an operation flowchart in the zoom lens of the third embodiment.

FIGS. 4A and 4B are flowcharts to show a series of operations from immediately after switch-on of power to output to the motors in the zoom lens, which is the third embodiment of the present invention. Since the structure of the zoom lens of the present embodiment is substantially the same as that in the first embodiment, the following description of operation will be done using the same reference symbols as those in the first embodiment, for the respective components. In the present embodiment, however, the memory 18 stores the wide-angle-extreme angle-of-view data and the telephoto-extreme angle-of-view data together with the coefficients of the proximate primary plane equation.

Immediately after switch-on of power, the CPU 5 proceeds to step 41 to initialize the interior of the CPU 5. The CPU also initializes the lens constituting the zoom portion Z and the lens constituting the focus portion F by use of the outputs from the position detectors 9, 16.

In step 42 the CPU then reads the wide-angle-extreme angle-of-view data and the telephoto-extreme angle-of-view data (permissible angles of view) out of the memory 18 and sets them in Wwide and Wtele, respectively. Each of the wide-angle-extreme angle-of-view data Wwide and the telephoto-extreme angle-of-view data Wtele in the present embodiment indicates an angle of view at the position where the zoom portion is located at an extreme (so-called electrical end) in the range in which the position detector 9 can detect the position.

In step 43 the CPU then initializes communication with the zoom demand 1 and the focus demand 2. The initialization operation is completed here and then the CPU transfers to the normal operation to control the zoom portion Z and the focus portion F in accordance with the outputs from the zoom demand 1 and from the focus demand 2.

In step 44 the CPU accepts input of the zoom speed data (zoom control information) Zspeed from the zoom demand 1 and in step 45 the CPU also accepts input of the normalized focus position data (focus control information) Fdata from the focus demand 2.

Next, in step 46 the CPU integrates the zoom speed data Zspeed supplied from the zoom demand 1 by use of Eq. (2) described in the first embodiment to calculate the normalized zoom position data (a target drive state) Zdata.

In step 47 the CPU then substitutes the normalized focus position data Fdata supplied from the focus demand 2, into Eq. (4) described in the first embodiment to calculate the focus position command (focus command information) Focus.

Further, in step 48 the CPU reads the calculation coefficients Czw, Cfw, and Dw (where w indicates data corresponding to the wide-angle extreme) of the proximate primary plane equation according to the focus position data Fdata.

In step 49 the CPU then substitutes the wide-angle-extreme angle-of-view data Wwide, the focus position command Focus, and the calculation coefficients Czw, Cfw, Dw into Eq. (5) described in the first embodiment to calculate wide-angle-extreme position data (a permissible drive end) Zwide.

Next, in step 50 the CPU reads the calculation coefficients Czt, Cft, and Dt (where t indicates data corresponding to the telephoto extreme) of the proximate primary plane equation according to the focus position data Fdata.

In step 51 the CPU then substitutes the telephoto-extreme angle-of-view data Wtele, the focus position command Focus, and the calculation coefficients Czt, Cft, Dt into Eq. (5) to calculate telephoto-extreme position data (a permissible drive end) Ztele.

In step 52 the CPU then compares the zoom position data Zdata with the wide-angle-extreme position data Zwide and the telephoto-extreme position data Ztele. When the zoom position data Zdata is present between the wide-angle-extreme position data Zwide and the telephoto-extreme position data Ztele, the CPU goes to step 54 to set the zoom position data Zdata as a zoom position command as it is. When the zoom position data Zdata is not located between the wide-angle-extreme position data Zwide and the telephoto-extreme position data Ztele, the CPU goes to step 53 to set the wide-angle-extreme position data Zwide as a zoom position command Zoom in the case of the zoom position data Zdata exceeding the wide-angle-extreme position data Zwide, or to set the telephoto-extreme position data Ztele as a zoom position command Zoom in the case of the zoom position data Zdata exceeding the telephoto-extreme position data Ztele.

Next, in step 55 the output of the counter in the position detector 9 is set in the counter buffer Zfol and the output of the counter in the position detector 16 is also set in the counter buffer Ffol.

Further, in step 56 the CPU performs the position control calculation of the zoom portion Z by use of the zoom position command Zoom and the counter buffer Zfol and also performs the position control calculation of the focus portion F by use of the focus position command Focus and the counter buffer Ffol.

In step 57 the CPU then outputs the result of the position control calculation of the zoom portion Z, gained in step 56, to the amplifier 6 to actuate the motor 8 and also outputs the result of the position control calculation of the focus portion F to the amplifier 13 to actuate the motor 15. Thereafter, the CPU repeatedly executes step 44 to step 57 until the power is switched off.

In the present embodiment, as described above, when the zoom position data Zdata indicating the target drive position of the zoom portion Z is over the wide-angle-extreme position data Zwide or the telephoto-extreme position data Ztele, either of these wide-angle-extreme position data Zwide and telephoto-extreme position data Ztele is used as the zoom position command Zoom; in addition, each of the wide-angle-extreme position data Zwide and the telephoto-extreme position data Ztele is calculated in consideration of the focus position command Focus. Thanks to this arrangement, the angle of view is kept constant at the wide-angle extreme and at the telephoto extreme, regardless of the driving state of the focus portion F.

The present embodiment was described as to the case using the wide-angle-extreme angle-of-view and telephoto-extreme angle-of-view data, but the apparatus may also be modified so as to implement the tracking function, using intermediate angle-of-view data between the wide-angle-extreme angle of view and the telephoto-extreme angle of view. In this case, the apparatus may also be arranged so that the intermediate angle-of-view data is supplied as the tracking angle-of-view data from the zoom demand 1 into the CPU 5. Further, the present embodiment was described as to the case using the both of the wide-angle-extreme angle-of-view and telephoto-extreme angle-of-view data, but the apparatus may also be modified so as to use only either one of them.

The present embodiment was described in the structure in which the zoom control information was supplied from the zoom demand 1, but the apparatus may also be modified so that the zoom control information is supplied from the control unit (manipulation device) of the camera.

Then the both of the zoom demand and the camera control unit may also be connected to the zoom lens of the present embodiment. In this case, if the tracking angle-of-view data is supplied from both the zoom demand and the camera control unit, there will be no need for switching of interface for connection to the CPU due to the difference between the types of data supplied from the zoom demand and from the camera control unit.

What is claimed is:

1. A control apparatus for a zoom lens, which drives and controls a zoom portion and a focus portion in accordance with input of zoom control information and focus control information, said control apparatus comprising:

a converting circuit which converts said zoom control information to angle-of-view information; and an arithmetic circuit which compares permissible angle-of-view information indicating a limit value of an angle of view with the angle-of-view information from said converting circuit to obtain target angle-of-view information and which gains zoom command information for achieving a target angle of view, based on the target angle-of-view information and said focus control information.

2. The control apparatus according to claim 1, wherein said arithmetic circuit sets said permissible angle of view as said target angle of view when said target angle of view is over said permissible angle of view, but the arithmetic circuit sets said target angle of view as said target angle of view as it is, when said target angle of view is not over said permissible angle of view.

3. The control apparatus according to claim 1, comprising a permissible angle-of-view arithmetic circuit which calculates said permissible angle of view, based on information indicating a permissible drive end of said zoom portion.

4. The control apparatus according to claim 1, comprising a manipulation device by which said focus control information is entered according to user's manipulation.

5. The control apparatus according to claim 1, comprising a manipulation device by which said focus control information is entered according to user's manipulation.

6. A control apparatus for a zoom lens, which drives and controls a zoom portion and a focus portion in accordance with input of zoom control information and focus control information, said control apparatus comprising:

a converting circuit which converts said zoom control information to angle-of-view information; and an arithmetic circuit which compares permissible angle-of-view range information indicating a variation-permissible range of angles of view, with the angle-of-view information from the converting circuit to obtain a commanded angle of view and which gains zoom command information for achieving said commanded angle of view, based on the commanded angle of view and said focus control information.

7. The control apparatus according to claim 6, wherein said arithmetic circuit sets a maximum angle of view or a minimum angle of view in said permissible angle-of-view range as said commanded angle of view when the angle of view from said converting circuit is over said permissible angle-of-view range, but said arithmetic circuit sets the angle of view from said converting circuit as said commanded angle of view when the angle of view from said converting circuit is not over said permissible angle-of-view range.

8. The control apparatus according to claim 6, comprising a permissible angle-of-view arithmetic circuit which calculates said permissible angle-of-view range, based on information indicating a permissible drive range of said zoom portion.

9. A control apparatus for a zoom lens, which drives and controls a zoom portion and a focus portion in accordance with input of zoom control information and focus control information, said control apparatus comprising:

a control circuit which calculates a permissible drive end of said zoom portion for achieving a permissible angle of view, based on permissible angle-of-view information and said focus control information, and which controls the zoom portion, based on comparison between the permissible drive end and said zoom control information.

10. The control apparatus according to claim 9, wherein said control circuit sets information indicating said permissible drive end as the zoom control information when said zoom control information is over said permissible drive end, but said control circuit sets the zoom control information as said zoom control information when said zoom control information is not over said permissible drive end, and the control circuit drives the zoom portion, based on the zoom control information thus set.

11. The control apparatus according to claim 10, wherein said zoom control information is information based on information indicating a manipulation speed of a manipulation device for driving said zoom portion.

12. A control apparatus for a zoom lens, which drives and controls a zoom portion and a focus portion in accordance with input of zoom control information and focus control information, said control apparatus comprising:

an arithmetic circuit which calculates a permissible drive end of said zoom portion for achieving a permissible angle of view, based on permissible angle-of-view information and said focus control information; and a limit circuit which limits driving to said permissible drive end, on the occasion of driving of the zoom portion based on said zoom control information.

13. A zoom apparatus comprising:

a manipulation member by which a zoom position is changed; a zoom position information forming circuit which forms zoom position information indicating a zoom position according to manipulation by the manipulation member; a converting circuit which converts the zoom position information to angle-of-view information; a limit information setting circuit which sets limit angle-of-view information; an arithmetic circuit which compares the limit angle-of-view information with the angle-of-view information converted into by said converting circuit and which calculates zoom position information for achieving said limit angle of view from focus information indicating a focus position and said limit angle-of-view information on the occasion of occurrence of such a situation that said angle-of-view information converted into is over the limit angle of view; and a control circuit which controls a zoom state in accordance with the zoom position information thus calculated.

14. A zoom apparatus comprising:

a zoom position information forming circuit which forms zoom position information indicating a target zoom position; a converting circuit which converts the zoom position information to angle-of-view information of target; an arithmetic circuit which calculates zoom position information corresponding to the angle-of-view information from focus information indicating a focus position and said angle-of-view information; and a control circuit which effects transfer into a zoom state according to the zoom position information thus calculated.

15. A zoom apparatus comprising:

a manipulation member by which a zoom position is changed; a zoom position information forming circuit which forms zoom position information indicating a zoom position according to manipulation by the manipulation member; a limit information setting circuit which sets limit angle-of-view information; an arithmetic circuit which calculates a limit position indicating a limit zoom position according to a limit angle of view from the limit angle-of-view information and focus position information indicating a focus position; and a control circuit which compares the limit position with the zoom position information formed by said zoom position information forming circuit and which regulates a zoom state in which there occurs a situation of the zoom position information exceeding the limit position, to the limit position.

16. A zoom apparatus comprising:

a preset circuit which presets zoom information;

a converting circuit which converts the preset zoom information to angle-of-view information;

an arithmetic circuit which calculates the zoom information, based on focus information and said angle-of-view information; and a driving portion which drives a zoom portion to a position according to the calculated zoom information.

* * * * *

UNITED STATES PATENT AND TRADEMARK OFFICE
CERTIFICATE OF CORRECTION

PATENT NO. : 6,268,967 B1
DATED : July 31, 2001
INVENTOR(S) : Kubo

It is certified that error appears in the above-identified patent and that said Letters Patent is hereby corrected as shown below:

<u>Column 4,</u>
Lines 23 and 25, delete "with" and insert therefor -- ith --

<u>Column 12,</u>
Line 25, delete "focus" and insert therefor -- zoom --

Signed and Sealed this

Eighteenth Day of June, 2002

*Attest:*

*Attesting Officer*

JAMES E. ROGAN
*Director of the United States Patent and Trademark Office*